United States Patent
Bari et al.

(10) Patent No.: US 8,937,903 B2
(45) Date of Patent: Jan. 20, 2015

(54) SYSTEM AND METHOD FOR PROVIDING A CONTENT DELIVERY NETWORK VIA A MOTOR VEHICLE

(75) Inventors: Farooq Bari, Kirkland, WA (US); Qingmin Hu, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 154 days.

(21) Appl. No.: 13/159,976

(22) Filed: Jun. 14, 2011

(65) Prior Publication Data

US 2012/0320824 A1   Dec. 20, 2012

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 29/08 | (2006.01) |
| H04W 4/06 | (2009.01) |
| H04W 4/18 | (2009.01) |
| H04W 4/00 | (2009.01) |
| H04B 7/212 | (2006.01) |
| H04L 29/06 | (2006.01) |
| H04W 12/06 | (2009.01) |
| H04W 4/04 | (2009.01) |

(52) U.S. Cl.
CPC .......... *H04L 29/08729* (2013.01); *H04W 4/06* (2013.01); *H04W 4/18* (2013.01); *H04L 63/08* (2013.01); *H04W 12/06* (2013.01); *H04W 4/046* (2013.01)

USPC .................... 370/328; 370/331; 370/338

(58) Field of Classification Search
USPC ........... 370/328, 331, 338; 709/202, 228, 242
See application file for complete search history.

(56) References Cited

U.S. PATENT DOCUMENTS

| | | | |
|---|---|---|---|
| 2003/0145038 A1 | 7/2003 | Bin Tariq et al. | |
| 2004/0068363 A1* | 4/2004 | Goto | 701/200 |
| 2006/0022842 A1 | 2/2006 | Zoladek et al. | |
| 2006/0089145 A1 | 4/2006 | Chen et al. | |
| 2006/0120326 A1 | 6/2006 | Takeuchi et al. | |
| 2008/0012725 A1 | 1/2008 | Zoladek et al. | |
| 2008/0043692 A1* | 2/2008 | Morita | 370/338 |
| 2009/0318124 A1 | 12/2009 | Haughn | |
| 2010/0020774 A1 | 1/2010 | Mahajan et al. | |
| 2010/0128694 A1 | 5/2010 | Choi-Grogan | |
| 2010/0241761 A1 | 9/2010 | Lee et al. | |

OTHER PUBLICATIONS

"Chrysler UConnect Web," Wikipedia, Jan. 22, 2011 en.wikipedia.org/wiki/Chrysler_UConnect.
"Sync with MyFord Touch®," Advertisement, Sports Illustrated, Apr. 11, 2011, p. 35.

* cited by examiner

*Primary Examiner* — Asad Nawaz
*Assistant Examiner* — Stephanie Chang
(74) *Attorney, Agent, or Firm* — Akerman LLP; Michael K. Dixon; Roy P. Zachariah

(57) ABSTRACT

A cache server disposed in a motor vehicle receives and caches content from a content distribution network when a load of a cellular link to the content distribution network is low. The cache server determines that the motor vehicle is turned off, broadcasts a wireless signal as part of a wireless network when the motor vehicle is turned off, and provides a device access to the content cached in the cache server via the wireless network.

20 Claims, 5 Drawing Sheets

SYSTEM AND METHOD FOR PROVIDING A CONTENT DELIVERY NETWORK VIA A MOTOR VEHICLE

FIELD OF THE DISCLOSURE

The present disclosure generally relates to communications networks, and more particularly relates to content delivery networks.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
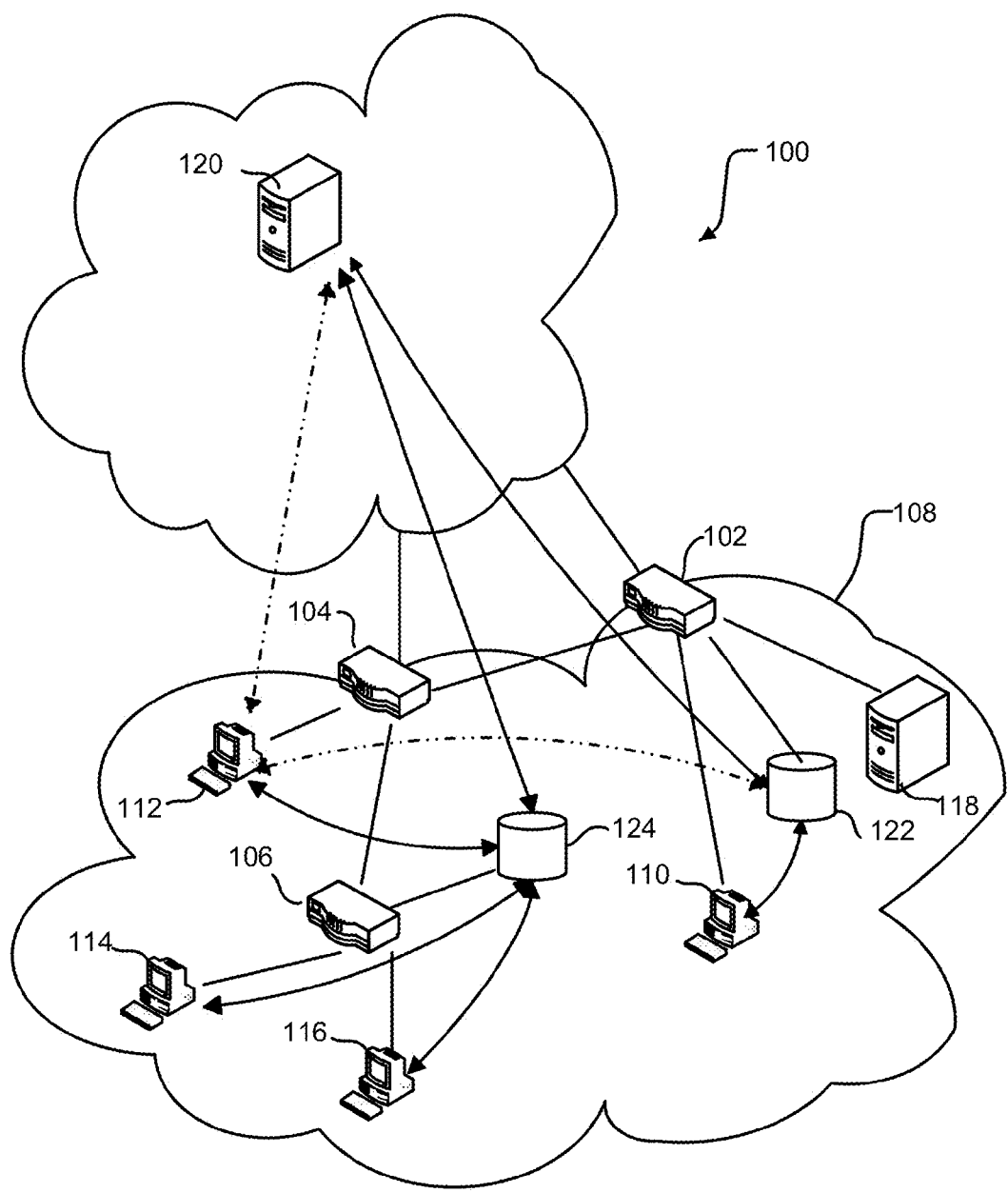
FIG. 1 is a block diagram illustrating a communications network in accordance with an embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110, 112, 114, and 116, the cache server closest to the client can be selected. The closest cache server may be the cache server having a shortest network distance, a lowest network cost, a lowest network latency, a highest link capacity, a lowest load, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively old or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
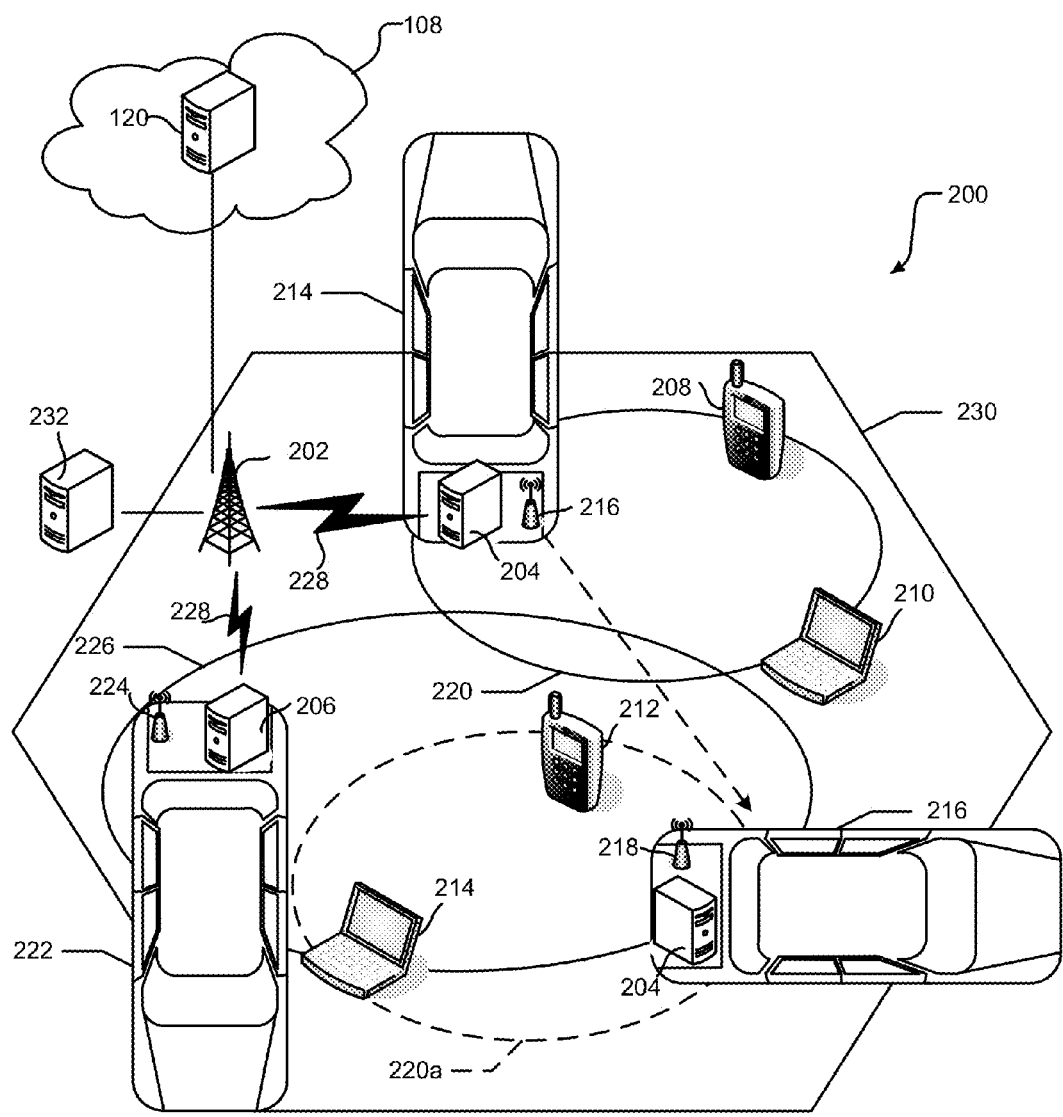
FIG. 2 is a block diagram illustrating a content distribution network that can be used in conjunction with the communications network of FIG. 1.

FIG. 2 shows a content distribution network 200 that can be used in conjunction with communications network 100. The content distribution network 200 includes a base station 202, cache servers 204 and 206, client devices 208, 210, 212, and 214, and the content server 120 of the AS 108. The cache server 204 can be incorporated into a motor vehicle 216, such that the cache server can be mounted within the motor vehicle. The cache server 204 can use an access point 218 built into the motor vehicle to create localized coverage areas 220 and 220a, which can be micro cells within the content distribution network 200. The cache server 206 can be incorporated into a motor vehicle 222, such that the cache server can be mounted within the motor vehicle. The cache server 206 can use an access point 224 built into the motor vehicle to create localized coverage area 226, which can be a micro cell within the content distribution network 200.

The localized coverage areas 220 and 220a can be wireless networks created by the access point 218, and the localized coverage area 226 can be created by the access point 224. Depending on the wireless technology, a micro cell can be referred to as a femtocell, or as a hot spot in case of Wireless Fidelity (WiFi) or Bluetooth technologies. The base station 202 is in communication with the content server 120 of AS 108, with the cache server 204, and with the cache server 206. The base station 202 is in communication with the cache servers 204 and 206 via cellular connections 228 of a cellular network 230. The cache server 204 can communicate with the client devices 208 and 210 when the client devices are within the localized coverage area 220. The cache server 204 can also communicate with the client devices 212 and 214 when the client devices are within the localized coverage area 220a. The cache server 206 can communicate with the client device 214 when the client device is within the localized coverage area 226.

The cache servers 204 and 206 can receive popular content from the content server 120 in the AS 108, such as news websites, commonly accessed songs or videos, and the like. The popular content can be determined based on information obtained by the content server 120, such as a number of times that specific content is requested. The content server 120 can push the popular content to the cache servers 204 and 206 via the cellular connection 228 of the cellular network 230 serviced by the base station 202. The cellular connection 228 can be a cellular link between the cache server 204 and the content distribution network 200. In an embodiment, the cache server 204 can receive the popular content at night, during periods of low loads on cellular link 228, and the like.

As the motor vehicle 216 moves around the distribution network 200, the hot spot created by the access point 218 can move from the localized coverage area 220 to the localized coverage area 220a, and to any area along the path traveled by the motor vehicle. In an embodiment, the cache server 204 can activate the access point 218 to create the localized coverage area 220 when the motor vehicle is turned off, such that the localized coverage area is not provided while the motor vehicle 216 is moving through the content distribution network 200. The localized area of coverage 220 or 220a can be a hot spot for a particular Internet and cellular telephone service provider. That is, the client devices 208, 210, 212, and 214 associated with the particular Internet and cellular telephone service provider can detect the localized coverage area 220 or 220a as a hot spot or femtocell, and can connect to the access point 218 of the cache server 204. The localized coverage area 220 can encompass an outdoor coverage area or an indoor coverage area near the motor vehicle 216, such as a parking lot, park, library, hospital, retail store, residence, and the like. For example, if the motor vehicle has stopped and has been turned off next to a park, the localized coverage area 220 may extend into the park. The size of the localized coverage areas 220 and 220a can be determined at least in part by a transmission power of the access point 218, as well as path loss, shadowing, and the like on a wireless signal from the access point.

In an embodiment, the localized coverage area 220a of the cache server 204 can overlap with the localized coverage area 226 of the cache server 206, such that the cache servers can detect each other. The cache servers 204 and 206 can then pass authentication information to each other so that the cache servers can mutually authenticate that each of the cache servers are associated with the same service provider. The cache server 204 can determine whether the cache server 206 has new content, which can be updates to content currently cached in the cache server 204, content that is different than the content currently cached in the cache server 204, and the like. When the cache server 204 determines that the cache server 206 has new content, the cache server 204 can utilize the new content to increase the amount of content available in the localized coverage areas 220 and 220a.

For example, the cache server 204 can provide the client devices 208-214 with access to the new content. The cache server 204 may receive the new content from the cache server 206, and cache the new content in a memory of the cache server 204. Alternatively, the cache server 204 may create a look up table associating an IP address for the cache server 206 with the new content. Thus, the cache server 204 can then either have a copy of the new content to provide to the client devices 208-214, or have the location of the new content stored in the look up table.

The client devices 208-214 can be multimode devices, such that the client devices can communicate with both the base station 202 via the cellular connection 228, and with the access point 218 via a Bluetooth or WiFi signal. When the client device 208 enters the localized coverage area 220, the client device can attempt to connect to the access point 218 via transmission and reception of attachment signaling. In an embodiment, a connecting signaling from a client device can include a Location Area Update (LAU) and/or Routing Area Update (RAU), or any other synchronization procedure compatible with the wireless technology of the localized coverage area 220, such as WiFi, Worldwide Interoperability for Microwave Access (WiMAX), Enhanced General Packet Radio Service (Enhanced GPRS), Long Term Evolution (LTE), Ultra Mobile Broadband (UMB), Zigbee, or the like.

The client device 208 can also provide authentication information to cache server 204. The authentication information can include universal subscriber identification module ((U)SIM) based credentials or the like for the client device 208. The cache server 204 can then utilize the cellular connection 228 and the base station 202 to send the authentication information to an authentication server 232, which can remotely verify credentials of the client device 208. In another embodiment, the cache server 204 can receive and store a list of authentication information including the authentication information for each client device associated with the particular Internet and cellular telephone provider from the authentication server 232. The cache server 204 can then compare the authentication information provided by the client device 218 with the authentication information of the list of authentication information stored within the cache server to verify that the client device can connect to the access point 218.

When the client device has been authenticated and connected to the access point 218, the cache server 204 can receive a content request from the client device. If the content request is associated with the popular content cached in the cache server 204, the content can be provided to the client device. Additionally, the cache server 204 can verify that the requested content has not been updated since the content was cached in the cache server before the cache server provides the requested content to the client device 208. If the content has been updated, the cache server 204 can connect to the AS 108 via the cellular connection 228 and the base station 202 to retrieve the most recent content. If the cache server 204 has not cached the requested content, the cache server can connect to a content server, such as content server 120, that has the content via the cellular connection 228, and can receive the requested content. Alternatively, if the cache server 204 has not cached the requested content, the cache server can utilize the look up table and return an IP address of a cache server, such as cache server 206, that does have the requested content to the client device 208. The cache server 204 can provide the client device 210 with popular content in a similar fashion as discussed for client device 208.

In an embodiment, if the client device 208 is in the process of downloading content from the cache server 204 and the motor vehicle 216 drives away, the client device can then connect to the base station 202 via the cellular connection 228 of the cellular network 230 to receive the remainder of the content. In another embodiment, the client device 214 may be utilizing the cellular connection 228 of the cellular network 230 to download content when the motor vehicle 216 with the cache server 204 stops near the client device 214. The motor vehicle 216 can then be turned off, and the cache server 204 can activate the access point 218 to create the localized coverage area 220a. If the client device 214 is located within the localized coverage area 220a, the client device can detect the coverage area as a hot spot. The client device 214 can then connect with the access point 218, and can switch from the cellular network 230 to the localized coverage area 220a to download the remainder of the content. Thus, the client devices 208-214 can utilize the localized coverage areas 220 and 220a created by the access point 218 of the cache server 204 to download content instead of utilizing the cellular connection 228 of the cellular network 230.

Figure 3:
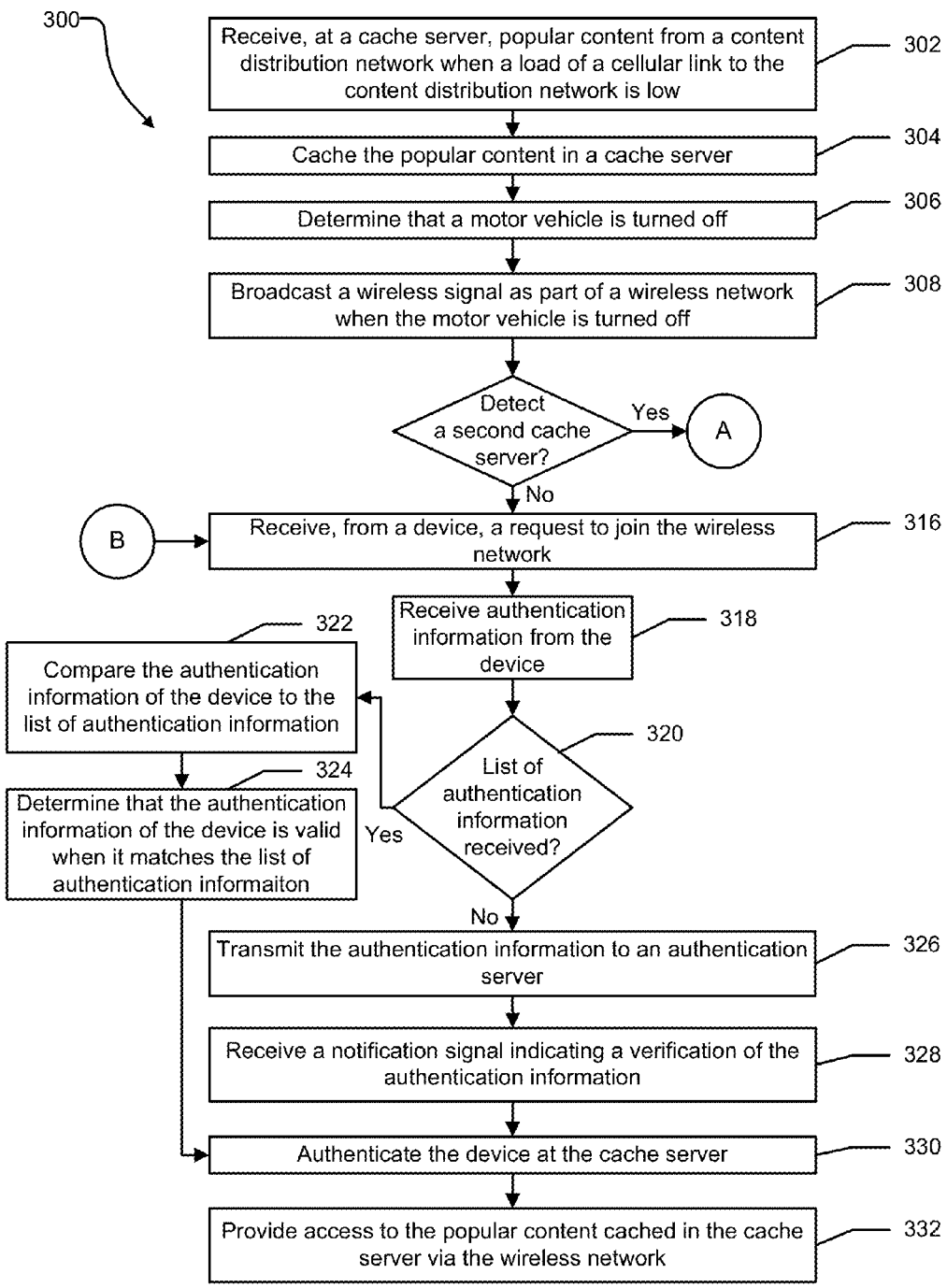
FIGS. 3 and 4 are flow diagrams illustrating a method for providing a mobile cache server within a content distribution network.
Figure 4:
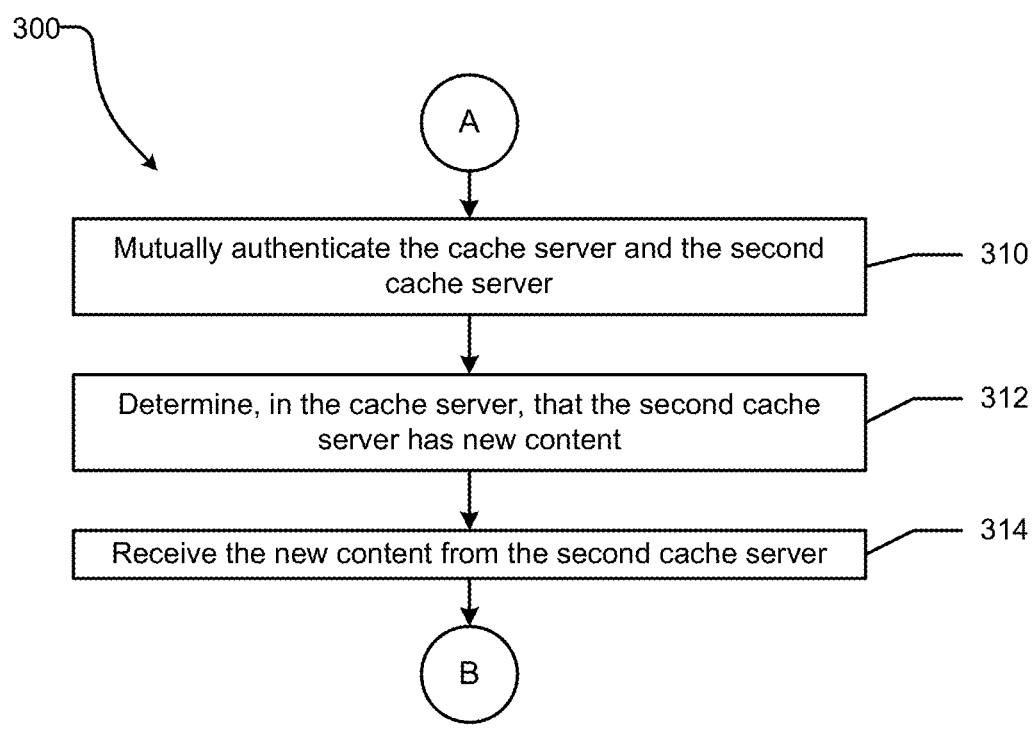

FIGS. 3 and 4 illustrate a method 300 for providing a mobile cache server within a content distribution network. At block 302, popular content is received by the cache server from the content distribution network when a load of a cellular link to the content distribution network is low. The cache server can be located within a motor vehicle. In an embodiment, the motor vehicle can be a rental car, a service vehicle of an Internet and cellular telephone service provider, or the like. The popular content can include news websites, commonly accessed songs, and commonly accessed videos. The popular content can be received via a cellular data connection, such as the cellular link, of a cellular network. At block 304, the popular content is cached in the cache server. A determination is made that the motor vehicle is turned off at block 306. At block 308, a wireless signal is broadcast as part of a wireless network when the motor vehicle is turned off. The wireless network can be a localized coverage area, such as a femtocell, a hot spot, or the like, from an access point of the cache server. At block 310, a determination is made whether a second cache server is detected. If the second cache server is not detected, the flow continues below at block 316.

Now referring to FIG. 4, if the second cache server is detected, the cache server and the second cache server mutually authenticate each other at block 310. The cache server can authenticate each other by passing authentication information to each other, and verifying the authentication information via an authentication server or with authentication information stored in the cache servers. At block 312, a determination is made that the second cache server has new content. The new content can be updates to content already stored on the cache server, content that is not currently stored in the cache server, and the like. The new content is received from the second cache server at block 314. In another embodiment, the cache server can create a lookup table to identify that the new content is located in the second cache server without receiving and storing the new content in the cache server.

Referring back to FIG. 3, a request to join the wireless network is received from a device at block 316. The device can be a smart cellular telephone, a portable computer, a tablet computer, a personal digital assistant, or the like. Authentication information is received from the device at block 318. At block 320, a determination is made whether a list of authentication information is received at the cache server. An authentication file including a list of authentication information for each of a plurality of devices can be received when the load on the cellular link to the content distribution network is low. If the list of authentication information is received at the cache server, the authentication information of the device is compared to the list of authentication information at block 322. At block 324, a determination is made that the authentication information of the device is valid when the authentication information of the device matches the list of authentication information.

However, if the list of authentication information is not received in the cache server, the authentication information is transmitted to an authentication server within the content distribution network via the cellular data connection or link of the cellular network at block 326. At block 328, a notification signal indicating a verification of the authentication information is received at the cache server via the cellular data connection or link of the cellular network. At block 330, the device is authenticated at the cache server. Access to the popular content cached in the cache server is provided via the wireless network after the device is authenticated at block 332.

Figure 5:
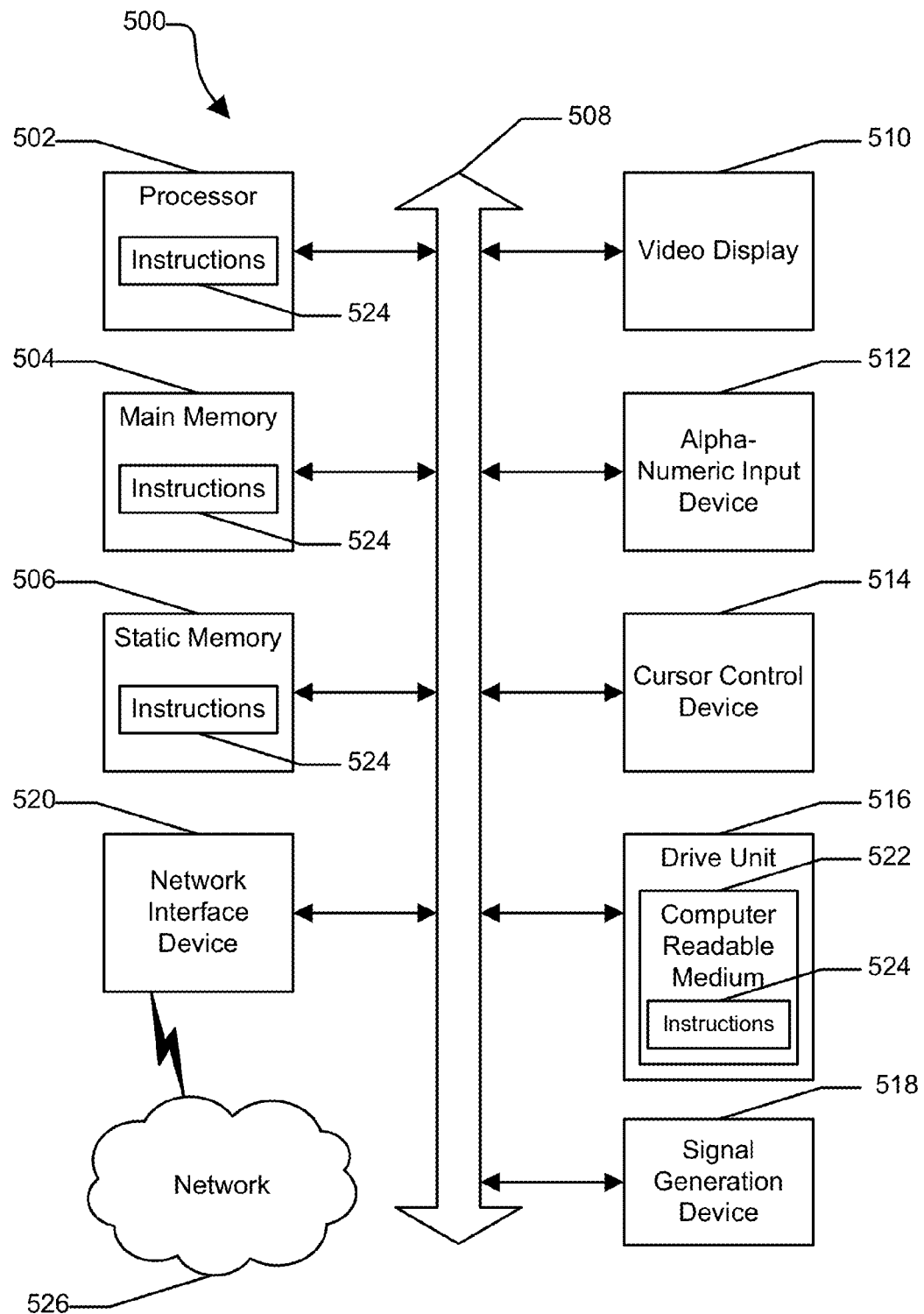
FIG. 5 is an illustrative embodiment of a general computer system.

FIG. 5 shows an illustrative embodiment of a general computer system 500. The computer system 500 can include a set of instructions that can be executed to cause the computer system to perform any one or more of the methods or computer based functions disclosed herein. The computer system 500 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

The computer system 500 may include a processor 502, such as a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510 such as a liquid crystal display (LCD), an organic light emitting diode (OLED), a flat panel display, a solid state display, or a cathode ray tube (CRT). Additionally, the computer system 500 may include an input device 512 such as a keyboard, and a cursor control device 514 such as a mouse. The computer system 500 can also include a disk drive unit 516, a signal generation device 518 such as a speaker or remote control, and a network interface device 520 to communicate with a network 526. In a particular embodiment, the disk drive unit 516 may include a computer-readable medium 522 in which one or more sets of instructions 524, such as software, can be embedded. The computer-readable medium can be a non-transitory computer readable medium, such as a hard disk drive, a flash memory, a read-only memory, a compact disk, a digital versatile disk, a cache, a random-access memory, and the like. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A cache server disposed in a motor vehicle, the cache server comprising:
   a memory that stores instructions; and
   a processor that executes the instructions to perform operations comprising:
      receiving content from a content distribution network when a load of a cellular link to the content distribution network is low;
      caching the content in the cache server;
      determining that the motor vehicle is turned off;
      activating an access point when the motor vehicle is determined to be turned off;
      broadcasting, by utilizing the access point, a wireless signal forming a localized coverage area wireless network when the motor vehicle is turned off, such that the localized coverage area wireless network is not provided while the motor vehicle is moving through the content distribution network;
      receiving, from a device, a request to join the localized coverage area wireless network;
      receiving authentication information from the device;
      authenticating the device at the cache server;
      authenticating the cache server with a different cache server if the cache server and the different cache server are determined to both be associated with a same service provider;
      detecting, if the cache server and the different cache server are both associated with the same service provider, whether the different cache server has an updated version of the content; and providing, if the different cache server has the updated version of the content, access to the updated version of the content via the localized coverage area wireless network after the device is authenticated.

2. The cache server of claim 1, wherein the operations further comprise:
transmitting the authentication information to an authentication server within the content distribution network via a cellular data connection of a cellular network; and
receiving a notification signal indicating a verification of the authentication information via the cellular data connection of the cellular network.

3. The cache server of claim 1, wherein the operations further comprise:
receiving an authentication file including a list of authentication information for each of a plurality of devices when the load on the cellular link is low.

4. The cache server of claim 3, wherein the operations further comprise:
comparing the authentication information of the device to the list of authentication information; and
determining that the authentication information of the device is valid when the authentication information of the device matches the list of authentication information.

5. The cache server of claim 1, wherein the content is received via the cellular link to the content distribution network.

6. The cache server of claim 1, wherein the content is selected from a group consisting of news websites, commonly accessed songs, and commonly accessed videos.

7. The cache server of claim 1, wherein the device is selected from a group consisting of a smart cellular telephone, a portable computer, a tablet computer, and a personal digital assistant.

8. A method of providing content from a first cache server disposed in a motor vehicle, the method comprising:
receiving, at the first cache server by utilizing instructions from memory that are executed by a processor, content from a content distribution network when a load of a cellular link to the content distribution network is low;
caching the content in the first cache server;
determining that the motor vehicle is turned off;
activating an access point when the motor vehicle is determined to be turned off;
broadcasting, from the first cache server and by utilizing the access point, a wireless signal forming a localized coverage area wireless network when the motor vehicle is turned off, such that the localized coverage area wireless network is not provided while the motor vehicle is moving through the content distribution network;
receiving, from a device, a request to join the localized coverage area wireless network;
receiving authentication information from the device;
authenticating the device at the first cache server;
authenticating the first cache server with a second cache server if the first cache server and the second cache server are determined to both be associated with a same service provider;
detecting, if the first cache server and the second cache server are both associated with the same service provider, whether the second cache server has an updated version of the content; and
providing, if the second cache sever has the updated version of the content, access to the updated version of the content via the localized coverage area wireless network after the device is authenticated.

9. The method of claim 8, wherein authenticating the device at the first cache server comprises:
transmitting the authentication information to an authentication server within the content distribution network via a cellular data connection of a cellular network; and
receiving a notification signal indicating a verification of the authentication information via the cellular data connection of the cellular network.

10. The method of claim 8, further comprising:
receiving an authentication file including a list of authentication information for each of a plurality of devices when the load on the cellular link is low.

11. The method of claim 10, wherein authenticating the device at the first cache server further comprises:
comparing the authentication information of the device to the list of authentication information; and
determining that the authentication information of the device is valid when the authentication information of the device matches the list of authentication information.

12. The method of claim 8, wherein the content is received via the cellular link to the content distribution network.

13. The method of claim 8, further comprising:
determining that the second cache server has new content; and
receiving, at the first cache server, the new content.

14. The method of claim 13, wherein the new content is different content than the content in the first cache server.

15. A computer readable device comprising a plurality of instructions, which when loaded and executed by a processor, cause the processor to perform operations comprising :
receiving, at a cache server, content from a content distribution network when a load of a cellular link to the content distribution network is low, wherein the cache server is disposed in a motor vehicle;
determining that the motor vehicle is turned off;
activating an access point when the motor vehicle is determined to be turned off;
broadcasting, from the cache server and by utilizing the access point, a wireless signal forming a localized coverage area wireless network when the motor vehicle is turned off, such that the localized coverage area wireless network is not provided while the motor vehicle is moving through the content distribution network;
receiving, from a device, a request to join the localized coverage area wireless network;
receiving authentication information from the device;
authenticating the device at the cache server;
authenticating the cache server with a different cache server if the cache server and the different cache server are determined to both be associated with a same service provider;
detecting, if the cache server and the different cache server are both associated with the same service provider, whether the different cache server has an updated version of the content; and
providing, if the different cache server has the updated version of the content, access to the updated version of the content via the localized coverage area wireless network after the device is authenticated.

16. The computer readable device of claim 15, wherein the operations further comprise:
transmitting the authentication information to an authentication server within the content distribution network via a cellular data connection of a cellular network; and receiving a notification signal indicating a verification of the authentication information via the cellular data connection of the cellular network.

17. The computer readable device of claim 15, wherein the operations further comprise:
receiving an authentication file including a list of authentication information for each of a plurality of devices when the load on the cellular link is low.

18. The computer readable device of claim 17, wherein the operations further comprise:
comparing the authentication information of the device to the list of authentication information; and
determining that the authentication information of the device is valid when the authentication information of the device matches the list of authentication information.

19. The computer readable device of claim 15, wherein the operations further comprise:
caching the content in the cache server.

20. The computer readable device of claim 15, wherein the content is selected from a group consisting of news websites, commonly accessed songs, and commonly accessed videos.

* * * * *